United States Patent
Patterson et al.

(10) Patent No.: US 7,570,609 B2
(45) Date of Patent: Aug. 4, 2009

(54) SYSTEM AND METHOD OF MESSAGE DELIVERY IN A WIRELESS COMMUNICATION NETWORK

(75) Inventors: Ian M. Patterson, Petersburg (CA); Allan David Lewis, New Dundee (CA); Alina Kushnir, Waterloo (CA); Simon Wise, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 449 days.

(21) Appl. No.: 11/305,599

(22) Filed: Dec. 16, 2005

(65) Prior Publication Data
US 2007/0223428 A1 Sep. 27, 2007

Related U.S. Application Data

(60) Provisional application No. 60/734,447, filed on Nov. 8, 2005.

(51) Int. Cl.
*H04B 7/14* (2006.01)
(52) U.S. Cl. .................... 370/315; 455/414.1
(58) Field of Classification Search ............... 370/315; 455/414.1
See application file for complete search history.

(56) References Cited

U.S. PATENT DOCUMENTS
5,493,692 A * 2/1996 Theimer et al. ............ 455/26.1
6,957,248 B2 * 10/2005 Quine et al. ................ 709/206

* cited by examiner

*Primary Examiner*—Lester Kincaid
*Assistant Examiner*—Steven Lim
(74) *Attorney, Agent, or Firm*—John J. Oskorep, Esq.

(57) ABSTRACT

A wireless communication system, comprising a host service, a wireless router system coupled to the host service, a wireless network coupling the wireless router system and a wireless mobile communication device ("mobile device"), adaptively delivers data to the mobile device in the wireless communication system using a notification message delivery mechanism. Mobile device reports its session state to the wireless router at a regular interval or if there is a change in state. The host service sends out a message to the wireless router to query the state of the mobile device. If the state of the mobile device is determined to be in coverage (or logged on), the host service sends down the data message to the mobile device using a payload message (MTH) with certain parameters configured. The data is temporarily stored at the wireless router. If the device is available, the message is sent to the device over the wireless network. If the device is not available, the wireless router returns the payload message back to the host service, updating the status of the device. The wireless router also reports to the host service any change in device state. If the device is back in coverage, the payload message is then resent from the host service to the device.

12 Claims, 3 Drawing Sheets

SYSTEM AND METHOD OF MESSAGE DELIVERY IN A WIRELESS COMMUNICATION NETWORK

CROSS-REFERENCE TO RELATED APPLICATION(S)

This patent application claims priority to and is related to the subject matter disclosed in the following commonly owned provisional application: "System and Method of Message Delivery in a Wireless Communication Network," filed 8 Nov. 2005, Application No. 60/734,447 (RIM No. 30572-ID) in the name(s) of: Ian Patterson, Allan Lewis, Alina Kushnir, and Simon; all of which is incorporated by reference herein.

FIELD OF THE INVENTION

The present invention generally relates to a wireless communication system, and more specifically to a system and a method for message notification and delivery on a mobile device.

BACKGROUND OF THE INVENTION

In a wireless communication system designed to deliver data to a wireless mobile communication device ("mobile device") such as a cellular telephone, a two-way pager, a wireless communication capable personal digital assistant ("PDA"), and other similar device, there are several main components in the wireless communication system. A host service, which provides services such as e-mail, calendar, instant messaging and Internet web browsing, holds the data to be delivered to the mobile device. The host service is coupled to a router, which couples the host service and a wireless network that is designed to communicate with the mobile device. To make a timely delivery of the data, the host service forwards the data for the mobile device to the router when the data becomes available. The router then forwards the data to the wireless network, which transmits the data to the mobile device. If the mobile device fails to receive the data, the router queues the data and re-forwards the data to the wireless network, which re-transmits the data to the mobile device. This process continues until the mobile device receives the data and acknowledges the reception or the process times out after a predetermined time period.

The above process of storing the message at the router and forwarding it to the device may be memory intensive. If the device is out of coverage or not connected to the network for a long period of time (i.e., user is on vacation for a week), the router may store a large number (and size) of messages, which may negatively impact the performance on the wireless router, host service and/or wireless network.

Furthermore, the above communication process requires numerous request and acknowledgement packets to be sent from the router and the mobile device to establish that the device is available to receive messages. This may create unnecessary network congestion, especially at peak network hours. It is desirable to formulate a more efficient wireless communication process to deliver messages to mobile devices.

BRIEF DESCRIPTION OF THE DRAWINGS

For a better understanding of the embodiments described herein and to show more clearly how it may be carried into effect, reference will now be made, by way of example only, to the accompanying drawings in which.

DETAIL DESCRIPTION OF THE PREFERRED EMBODIMENTS

Figure 1:
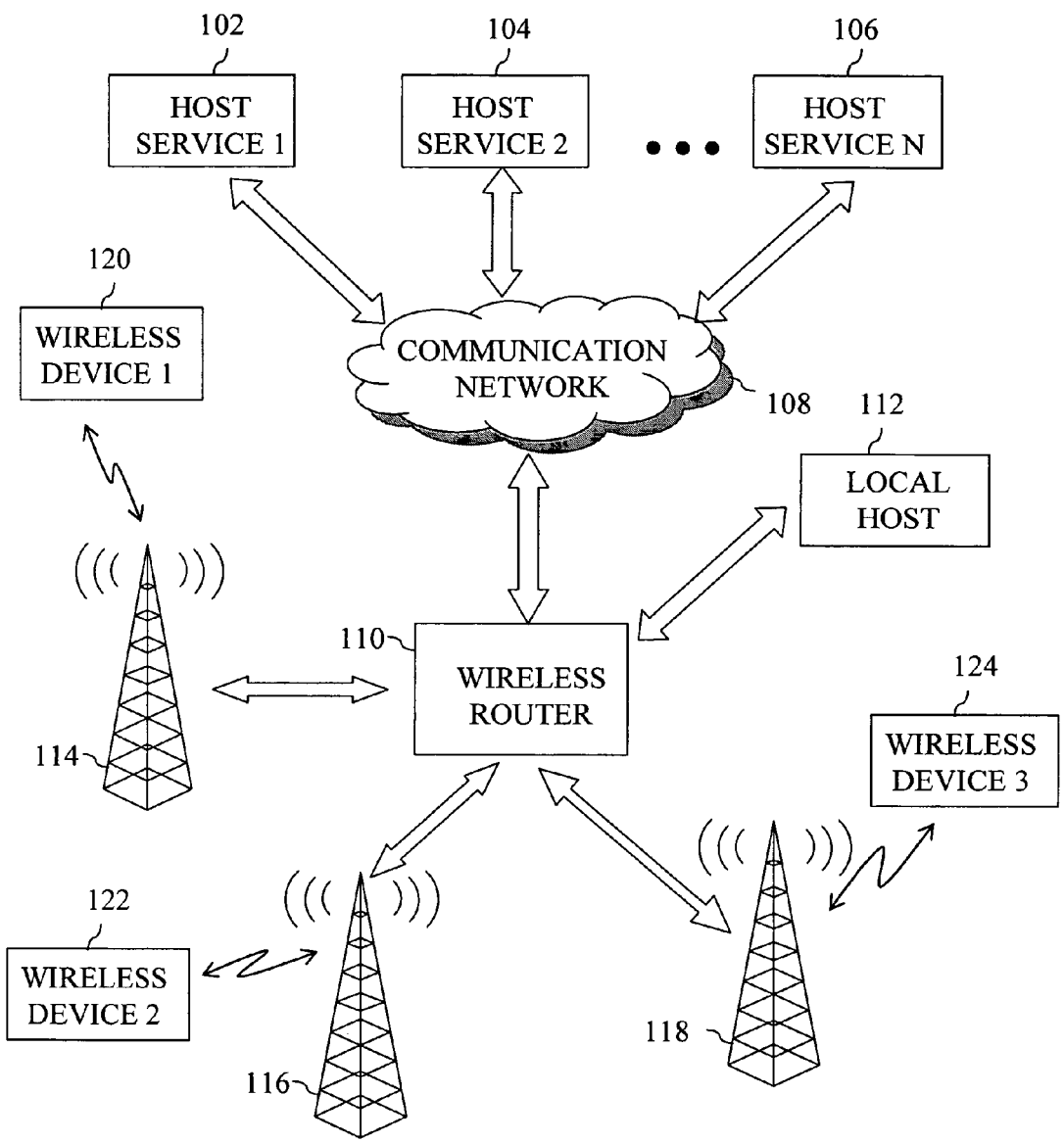
FIG. 1 is an exemplary environment in which a wireless communication system in accordance with at least one of the preferred embodiments may be practiced.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

One embodiment discloses a method of data message delivery from a host service to a wireless mobile device using a wireless router, the mobile device having a status, comprising the steps of sending a data message from said host service to said wireless router when the device status as indicated to said host service is "available", wherein said data message further comprises one or more request parameters, delivering said data message to said mobile device when the device status as indicated to said wireless router is "available", and receiving at least a portion of said data message at said host service when said device status is "unavailable" as indicated to said router, wherein said at least data message portion further comprises a response to said one or more request parameters.

Examples of applicable communication devices include pagers, cellular phones, cellular smart-phones, wireless organizers, personal digital assistants, computers, laptops, handheld wireless communication devices, wirelessly enabled notebook computers and the like, each of which is capable of sending messages to two or more recipients.

A wireless communication system, comprising a host service, a wireless router system coupled to the host service, a wireless network coupling the wireless router system and a wireless mobile communication device ("mobile device"), adaptively delivers data to the mobile device in the wireless communication system using a notification message delivery mechanism. In a preferred embodiment, the mobile device reports its activity status to the wireless router at a regular interval or when there is a change in status. The host service sends out a message to the wireless router to query the activity status of the mobile device. If the mobile device is determined to be in an active session or "available" (e.g. in coverage or logged on), the host service operates to send any pending data message to the mobile device using a payload message (MTH) with certain parameters configured. The data is temporarily stored at the wireless router. If the device is available, the message is sent to the device over the wireless network. If the device is not available, the wireless router returns the payload message back to the host service, and updates the status of the device. The wireless router also reports to the host service any change in device status. If the device is determined to be in an active session again or available (e.g. back in coverage), the payload message is then resent from the host service to the device.

FIG. 1 is an exemplary wireless communication system 100 in which a wireless communication system in accordance with at least one of the preferred embodiments may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. The host services 102, 104, and 106 are connected to a communication network 108 such as Internet, which connects to a wireless router system 110 allowing communication between the host services 102, 104, and 106 and the wireless router 110. The wireless router system 110 may also be connected to a host service, such as a local service 112, without the communication network 108. The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, a two-way paging network, a short range wireless network such as Bluetooth™ and IEEE 802.11 compliant network, and others alike, and the mobile devices 120, 122, and 124 are device compatible with the corresponding wireless network.

Mobile device 120, 122 and 124 are two-way communication device with advanced data communication capabilities having the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
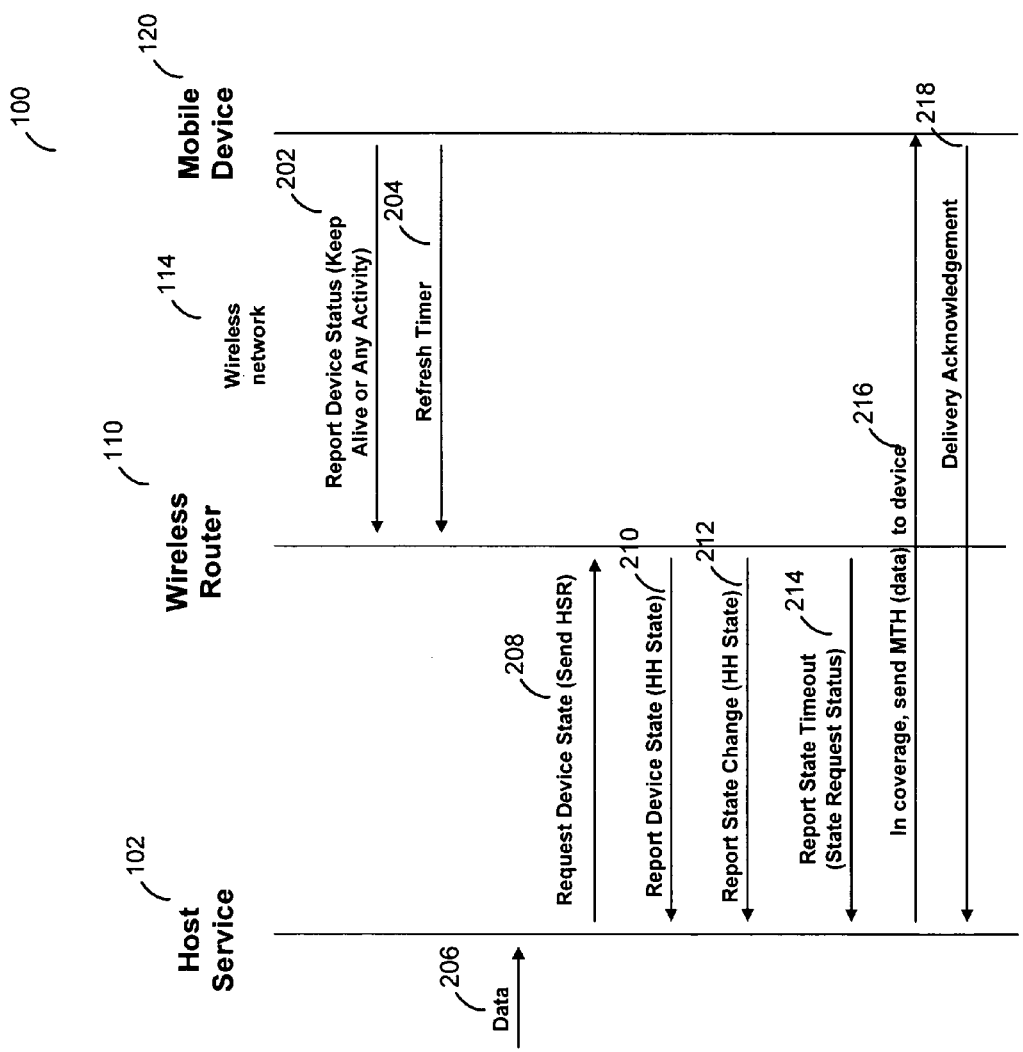
FIG. 2 is an exemplary sequence diagram of a data delivery mechanism for a wireless communication system according to a preferred embodiment.

FIG. 2 is an exemplary sequence diagram of a data delivery mechanism for a wireless communication system. Communication system 100 comprises a host service 102, wireless router 110, and a mobile device 120. Host service 102 is synonymous with host service 102, 104 and 106 of FIG. 1, and handles data message delivery to and from mobile device 120. Host service 102 receives e-mail messages from its designated corporate email server, such as Microsoft Exchange™, Lotus Notes™, and/or Novell Groupwise™, and temporarily stores the content on a host service server (not shown). In addition to supporting corporate mail servers, host service 102 may handle public mail services such as Yahoo Mail™, Microsoft Hotmail™, Google GMail™, and the like. In addition to e-mail messages, host service 102 may also receive other forms of data messages, including SMS messages, MMS message, instant messages, phone messages, facsimile messages, calendar message, browser links, and application alerts.

In this embodiment, mobile device 120 reports its activity status to wireless router 110, at step 202. Activities which may be reported on include any event on the device including user-initiated events or device-initiated events. Examples of user-initiated events may include a key press, a thumb-wheel/scroll-wheel actuation, an audible alert, releasing mobile device 120 from a device holster or carrying case, a touch input on a touch-sensitive display, a power on/off event Furthermore, device-initiated events may include an auto power on/off event or regular "ping" status updates sent from mobile device 120 to host service 102.

In the present embodiment, mobile device 120 has a configurable activity timer that is used to control and set the activity status of the device to either an "available" or an "unavailable" activity status. For example, if there is no user activity on the device mobile device 120 may send a "ping" packet to host service 102 every 15 minutes informing the host service 102 that it is still in coverage and available to receive messages.

Another example is that if there is no activity within a first 15 minute window tracked by the activity timer, mobile device 120 will send a "ping" packet to the wireless router 110 indicating an "available" status to keep the connection alive. If however there is no further activity in the next 15 minute window, mobile device 120 may implement a power-save schema whereupon detection of inactivity, the device 120 will back off sending the ping updates. For example, after sending a ping status update in the $1^{st}$ 15 minute window and the device detects no further activity, it may increase the window to 30 minutes. If there is no activity in the $2^{nd}$ window (30 minutes), the window may be further increased to 45 minute. These windows may be increased at a predefined rate until it reaches a maximum threshold (e.g., inactivity window limit of 90 minutes) or if a further device activity trigger event is sensed at which the window will be reset to the initial 15 minute window.

Referring to the present embodiment, host service 102 receives an incoming data message, at step 206. This data message may be an e-mail message, a SMS message, a MMS message, an instant message, web browsing information or a data request related to any relevant application on mobile device 120. Once the data message is received at the host service 102, host service 102 sends out a request to wireless router 110, at step 208, to determine the status or state of mobile device 120. In this embodiment, a Handheld State Request (HSR) packet is sent out at step 208. The HSR packet makes a request with wireless router 110 for the last known activity status of the device 120 and requests to be notified if this status changes.

Upon receiving the Handheld State Request (HSR), wireless router 110 sends back a Handheld State data packet (HH State), at step 210, reporting to host service 102 the current status of the mobile device 120. The Handheld State packet (HH State) may include such information as the device ID, device identifier and state identifier. The device ID field is a unique identifier for mobile device 120. The device identifier field may be a flag reporting whether the device 120 is a valid device. The state identifier field reports the current status of mobile device 120 which in this example is either available (e.g. in coverage) or unavailable (e.g. out of coverage).

If wireless router 110 detects that there is a change in the device status, for example, if it receives a change in device status from step 202, it then reports the device status change to host service 102, at step 212. The status change may also be sent by updating fields in the HH State packet.

Furthermore, if wireless router 110 detects that mobile device 120 has timed out of a service session or out of coverage, it sends a State Request Status packet, at step 214. The State Request Status packet sends out the device ID and status field set to "Expired", indicating that the session for mobile device 120 has expired or that it is no longer in service.

If host service 102 determines that mobile device 120 is available (i.e. in an active session, in coverage), host service 102 sends the data or payload message, as received at the host service 102 to the mobile device, at step 216. In this embodiment, the data or payload message is packaged as a Mobile-To-Handheld packet or MTH packet. Upon receiving the MTH packet incorporating the data message, mobile device 120 then sends a delivery acknowledgement packet back to host service 102, at step 218, confirming the receipt of the MTH packet at the mobile device.

In one embodiment, MTH packets are utilized to deliver the actual payload of a message. As noted above, the data message or payload may include an e-mail, a SMS message, an instant message, browsing data (i.e., fetch requests for Internet web browsing) or data to be delivered to applications on mobile device 120. MTH packets may be larger in size to accommodate a larger data message or payload. In one example, the maximum size of a MTH packet may be as large as 64K and messages that are larger than this size limit may require sending multiple MTH packets. A MTH packet may also include identifier fields and configurable parameter fields. Some example of identifier fields may include destination info, date, time, and sender/recipient info. Examples of configurable parameters may include flags for the data return status and state request status.

The aforementioned data delivery mechanism, as outlined in FIG. 2, enables mobile device 120 to report its activity status to wireless router 110, and also enable wireless router 110 to update host service 102 with the device activity status. In wireless communication system 100, small data packets such as "ping" packets, HSR packets, HH State packets, State Request Status packets, as outlined in FIG. 2, are used for notification of the status of mobile device 120. Larger MTH packets are used to deliver data or payload messages.

In certain wireless communication systems, the creation, delivery and confirmation of numerous notification packets such as ping packets, HSR packets, HH State packets and State Request Status packets may cause network congestion and increase network traffic.

Figure 3:
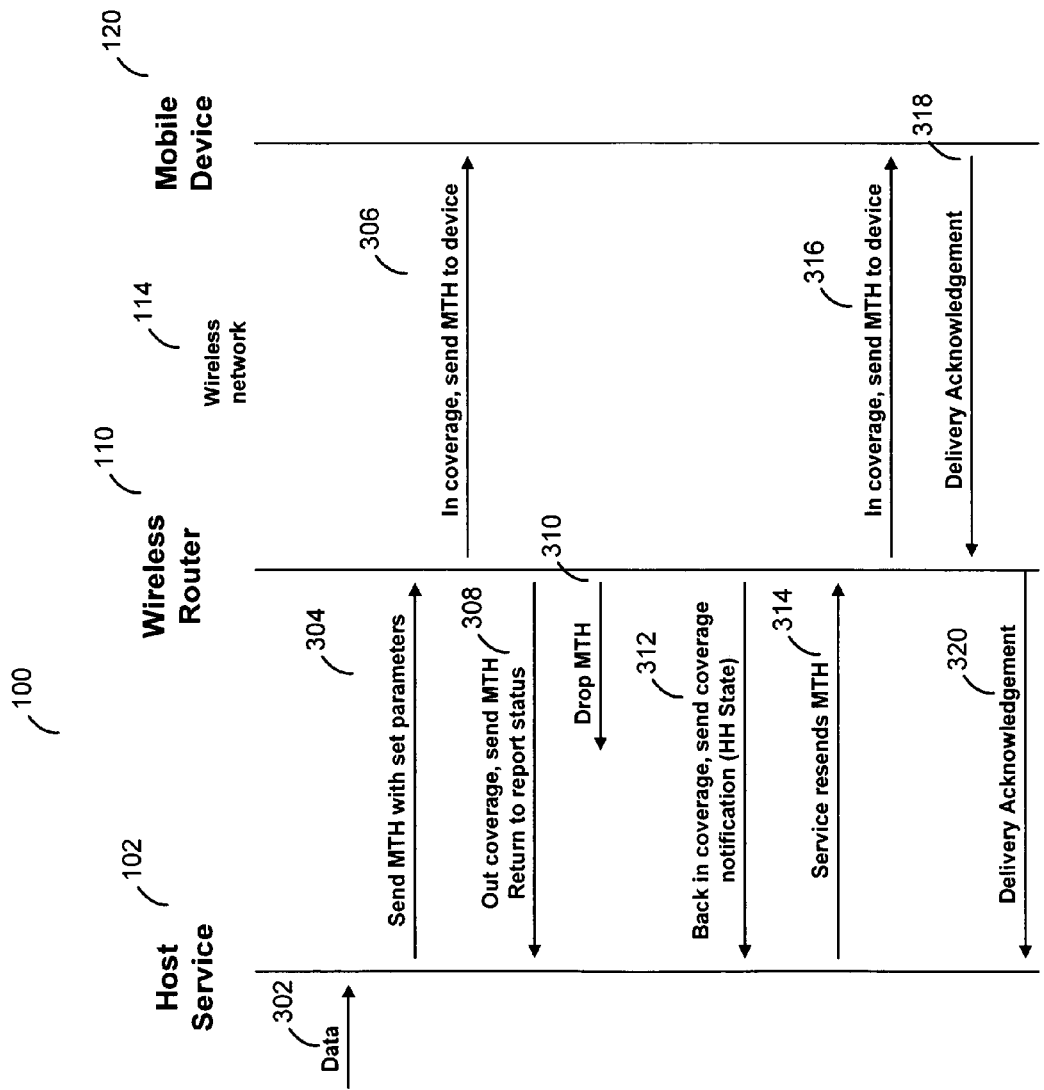
FIG. 3 is an exemplary sequence diagram to illustrate a data delivery mechanism utilizing data piggybacking according to another preferred embodiment.

Since MTH packets contain parameter and identifier fields, these fields may be populated when MTH packets are sent, thereby avoiding the need for further notification packets. FIG. 3 is an exemplary sequence diagram illustrating a preferred data delivery mechanism using MTH packets. Communication system 100 receives data from a plurality of data sources, at host service 102, at step 302. Example data sources may include e-mail servers, instant message servers, Internet e-mail, web data, and SMS servers. Once a data message is received at host service 102, it is repackaged into one or more MTH packets and sent out to wireless router 110, at step 304. The MTH packet has relevant flags for the "data_return" and "state_request" fields set, to solicit feedback action for data delivery. These fields may contain information that may be traditionally captured by the HSR packet, HH State packet or State Request Status packet.

Prior to forwarding a MTH packet to mobile device 120, wireless router 110 determines the activity status of mobile device 120 as described above in connection with FIG. 2. If mobile device 120 is determined to be available, wireless router 120 sends the MTH packet to mobile device 120, at step 306.

Upon successful delivery of the MTH packet, a delivery acknowledgement packet is sent from mobile device 120 to wireless router 110, at step 318. The delivery acknowledgment packet affirms that the data message (i.e., MTH packet) has successfully been delivered to the mobile device 120. The delivery acknowledgment packet is also sent from wireless router 110 to host server 102, at step 320, to report to host service 102 the delivery status. FIG. 3 show a specific example where the mobile device either in coverage (i.e. available) or out of coverage (i.e. unavailable). An in coverage state may occur when mobile device 120 is in wireless coverage or is connected to an active service session. An out of coverage state occurs when mobile device 120 is out of wireless coverage or is disconnected or in an inactive session. In this particular example, if mobile device 120 is determined to be out of coverage, wireless router 110 sends a MTH return packet back to the host service, at step 308, informing the host service 102 that it is out of coverage.

The MTH return packet may comprise of only of the relevant parameters, in this case, reporting to host service 102 the status that mobile device 120 is out of coverage and that the message has not been delivered. In this example, status information reported by the MTH return packet is determined by whether the "data_return" and "state_request" flags are set. The MTH return packet may optionally also return the original MTH packet (with its payload) back to the host service 102. In this case, once a MTH return packet is sent to host service 102, the original MTH packet at wireless router 110 would be erased from memory from wireless router 110, at step 310.

Once mobile device 120 is back in coverage, wireless router 110 is informed about this state change and sends out a HH State packet, at step 312, reporting the state change that the device 120 is back into coverage and can receive messages. Once the host service 102 receives this notification that the destination mobile device 120 is back in coverage (or service has been restored), host service 102 resends the MTH packet, at step 314, to be delivered to the mobile device 120, at step 316. Upon receiving the MTH packet, mobile device 120 sends back a delivery acknowledgement to the host service 102, at steps 318 and 320.

One benefit of the data delivery mechanism using MTH packets, as outlined in FIG. 3, is that by setting such parameters as 'data_return' and 'state_request', the system is eliminating the need of sending out additional Handheld State Request (HSR) packets or State Request Status packets, as outlined in FIG. 2, thereby reducing amount of network traffic to be sent from host service 102 to wireless router 110. The "data_return" and "state_request" parameter fields are essentially "piggybacking" off existing MTH payload packets that normally would be sent to mobile device 120.

The "data_return" and "state_request" parameters are used to control different states of message delivery at wireless router 110. If host service 102 sends a MTH packet with the "data_return" parameter set (i.e., turned "on" or set to "yes"), wireless router 110 sends a MTH return packet back to the host service 102, when mobile device 120 is known to be unavailable (e.g. out of coverage). However, wireless router 110 may not return the MTH packet to the host service 102 if mobile device 120 is determined not to be registered on wireless router 110, or if the service or existing session connection between mobile device 120 and wireless router 110 has expired.

If there is a change in the device status (e.g. logon, log off, in or out of coverage), wireless router 110 sends back a status report to the host service 102 on this change. For example, if host service 102 sends an MTH packet with "state_request" parameter set to the wireless router 110, wireless router 110 is thereby instructed to notify host service 102 that mobile device 120 is back in coverage. This is archived by sending a HH State packet at step 312. The inverse is also true; if the "state_request" field is not set in the MTH packet, the HH State packet is not sent back to host service 102.

Certain wireless router designs may no longer store the payload messages (e.g., MTH messages) in memory. In these router designs, if mobile device 120 is not available, the router may drop the MTH packet and inform host service 102 to resend the MTH packet when the mobile device 120 is back in coverage. This mechanism of using MTH parameters as outlined in FIG. 3, frees up memory and increases available resources at wireless router 110 to handle more MTH requests, thereby providing higher throughput.

An alternate data delivery mechanism may send MTH packets from host service 102 to wireless router 110, directly to mobile device 120, across wireless network 114, irrespective of whether mobile device 120 is available (i.e., in coverage). If mobile device 120 receives the MTH packet, it will send out an acknowledgement back to host service 102. However, the host service 102 may continually blast MTH packets to mobile device 120 until it receives the receipt acknowledgement. This mechanism is resource intensive; numerous MTH packets may be sent across wireless network 406, when only one packet is necessary. Furthermore, this mechanism may cause further network congestion if numerous users consistently blast MTH packets to the device. The design proposed in FIG. 3, attempts to address the packet blasting problem since only one MTH packet is sent to the device once the device is deemed to be available to receive the message.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of data message delivery from a host service to a wireless mobile device in a wireless communication network via a wireless router, said wireless mobile device having a status at said wireless router of at least one of "available" and "unavailable," wherein "available" is indicative of said wireless mobile device being in-coverage with said wireless communication network and "unavailable" is indicative of said wireless mobile device being out-of-coverage with said wireless communication network, the method comprising the steps of:

sending, from said host service to said wireless router, a user data message that is addressed to an address of said wireless mobile device, said user data message comprising a user data payload and one or more request parameters, said one or more request parameters instructing said wireless router on whether to return at least a portion of said user data message to said host service when said device status is "unavailable";

said user data message that is addressed to the address of said wireless mobile device being delivered, via said wireless communication network, to said wireless mobile device from said wireless router in response to said user data message being sent when said device status as indicated at said wireless router is "available" which is indicative of said wireless mobile device being in-coverage, but otherwise not being delivered to said wireless mobile device from said wireless router in response to said user data message being sent when said device status as indicated at said wireless router is "unavailable" which is indicative of said wireless mobile device being out-of-coverage; and receiving said at least user data message portion at said host service in response to said user data message being sent but not delivered to said wireless mobile device when said device status is "unavailable" and said one or more request parameters instruct said wireless router to return said at least user data message portion when said device status is "unavailable".

2. The method of claim 1 wherein said one or more request parameters further comprises a request for device status as indicated to said wireless router, and the at least user data message portion includes the device status as indicated to said wireless router.

3. The method of claim 2 wherein if said at least user data message portion indicates said device status is "unavailable" as indicated to said wireless router, said method further comprising re-sending the user data message from said host service to said wireless router when said device status as indicated to said host service is "available".

4. The method of claim 1 wherein said request parameters consists of a "data_return" and a "status request" parameter.

5. The method of claim 4 wherein said request parameters are configurable.

6. The method of claim 1, further comprising:

failing to receive said at least user data message portion when said device status is "unavailable" and said one or more request parameters instruct said wireless router not to return any user data message portion when said device status is "unavailable".

7. A host server adapted to deliver a user data message to a wireless mobile device in a wireless communication network via a wireless router, said wireless mobile device having a status at said wireless router of at least one of "available" and "unavailable," wherein "available" is indicative of said wireless mobile device being in-coverage with said wireless communication network and "unavailable" is indicative of said wireless mobile device being out-of-coverage with said wireless communication network, the host server being further adapted to:

send, from the host server to said wireless router, a user data message that is addressed to an address of said wireless mobile device said user data message comprising a user data payload and one or more request parameters, the one or more request parameters instructing said wireless router on whether to return at least a portion of said user data message to the host service when said device status is "unavailable";

said user data message that is addressed to the address of said wireless mobile device being delivered, via said wireless communication network, to said wireless mobile device in response to said user data message being sent when said device status as indicated to said wireless router is "available" which is indicative of said wireless mobile device being in-coverage, but otherwise not being delivered to said wireless mobile device from said wireless router in response to said user data message being sent when said device status as indicated at said wireless router is "unavailable" which is indicative of said wireless mobile device being out-of-coverage; and receive, at the host server, said at least user data message portion in response to said user data message being sent but not delivered to said wireless mobile device when said device status is "unavailable" and the one or more request parameters instruct said wireless router to return said at least user data message portion when said device status is "unavailable".

8. The host server of claim 7 wherein the one or more request parameters further comprises a request for device status as indicated to the wireless router, and the at least user data message portion includes the device status as indicated to the wireless router.

9. The host server of claim 7 wherein if the response indicates the device status is "unavailable" as indicated to the wireless router, the host server being further adapted to resend the user data message to the wireless router when the device status as indicated to the host service is "available".

10. The host server of claim 7 wherein the request parameters consists of a "data_return" and a "status request" parameter.

11. The host server of claim 7 wherein the request parameters are configurable.

12. The host server of claim 7, which is further adapted to: fail to receive any at least user data message portion when said device status is "unavailable" and the one or more request parameters instruct the wireless router not to return the at least user data message portion when the device status is "unavailable".

* * * * *